(12) United States Patent
Wang et al.

(10) Patent No.: US 11,373,407 B2
(45) Date of Patent: Jun. 28, 2022

(54) ATTENTION GENERATION

(71) Applicant: International Business Machines Corporation, Armonk, NY (US)

(72) Inventors: Qing Wang, Beijing (CN); Shi Lei Zhang, Beijing (CN); Yonghua Lin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 16/663,767

(22) Filed: Oct. 25, 2019

(65) Prior Publication Data

US 2021/0124931 A1    Apr. 29, 2021

(51) Int. Cl.
*G06V 20/40*    (2022.01)
*H04N 21/44*    (2011.01)
*G06K 9/62*    (2022.01)

(52) U.S. Cl.
CPC .......... *G06V 20/46* (2022.01); *G06K 9/6228* (2013.01); *H04N 21/44008* (2013.01)

(58) Field of Classification Search
USPC ................. 382/156, 195, 103, 180
See application file for complete search history.

(56) References Cited

U.S. PATENT DOCUMENTS

| | | | | |
|---|---|---|---|---|
| 7,116,716 B2 * | 10/2006 | Ma | ........................ | G06V 20/40 382/236 |
| 7,562,056 B2 * | 7/2009 | Ma | ........................ | G06V 10/25 382/175 |
| 9,830,709 B2 | 11/2017 | Li et al. | | |
| 10,210,391 B1 * | 2/2019 | Jones | ...................... | G06V 20/40 |
| 10,990,826 B1 * | 4/2021 | Haider | .................. | G06V 20/10 |
| 2006/0155684 A1 * | 7/2006 | Liu | ........................ | G06F 16/954 |
| 2008/0304740 A1 * | 12/2008 | Sun | ........................ | G06V 10/457 382/168 |
| 2010/0290705 A1 * | 11/2010 | Nakamura | .............. | G06T 11/60 382/173 |
| 2011/0158510 A1 * | 6/2011 | Aguilar | .................. | G06V 20/41 382/199 |
| 2012/0275701 A1 * | 11/2012 | Park | ..................... | G06V 10/462 382/173 |
| 2012/0288189 A1 * | 11/2012 | Hu | ........................ | G06V 10/462 382/164 |
| 2013/0058579 A1 * | 3/2013 | Kawanishi | ............ | G06F 16/583 382/195 |

(Continued)

OTHER PUBLICATIONS

Zhao et al, "Saliency Detection by Multi-Context Deep Learning" 2015IEEE, pp. 1265-1273 (Year: 2015).*

(Continued)

*Primary Examiner* — Kathleen Y Dulaney
(74) *Attorney, Agent, or Firm* — Kelli D. Morin

(57) ABSTRACT

A computer-implemented method for attention generation is provided. In this method, a plurality of image frames can be obtained from a video stream. An original attention for a first image frame of the plurality of image frames can be generated. Then, at least one interested area can be identified in the first image frame. A local attention for each of the at least one interested area can be generated. Moreover, a total attention for the first image frame can be generated based on the original attention of the first image frame and the local attention of each of the at least one interested area.

12 Claims, 6 Drawing Sheets

(56) References Cited

U.S. PATENT DOCUMENTS

| | | | | |
|---|---|---|---|---|
| 2014/0307971 | A1* | 10/2014 | Hanzawa | G06V 10/464 |
| | | | | 382/195 |
| 2015/0071532 | A1* | 3/2015 | Ruan | G06T 7/13 |
| | | | | 382/199 |
| 2015/0117784 | A1* | 4/2015 | Lin | G06T 11/60 |
| | | | | 382/195 |
| 2015/0154759 | A1* | 6/2015 | Nakayama | H04N 5/145 |
| | | | | 382/103 |
| 2015/0363635 | A1* | 12/2015 | Suri | G11B 27/034 |
| | | | | 386/241 |
| 2016/0210528 | A1* | 7/2016 | Duan | G06V 10/42 |
| 2016/0358035 | A1* | 12/2016 | Ruan | G06K 9/627 |
| 2017/0053181 | A1* | 2/2017 | Tunau | G06V 10/235 |
| 2017/0200472 | A1* | 7/2017 | Munukutla | G06V 10/25 |
| 2017/0262705 | A1* | 9/2017 | Li | G06V 20/41 |
| 2017/0293804 | A1 | 10/2017 | Min et al. | |
| 2017/0351941 | A1* | 12/2017 | Mishra | G06V 10/82 |
| 2018/0181593 | A1* | 6/2018 | Ranzinger | G06F 16/5838 |
| 2019/0122103 | A1* | 4/2019 | Gao | G06K 9/6296 |
| 2019/0132520 | A1* | 5/2019 | Gupta | H04N 5/2628 |
| 2019/0340462 | A1* | 11/2019 | Pao | G06V 10/82 |
| 2020/0097754 | A1* | 3/2020 | Tawari | G06V 20/56 |
| 2020/0117951 | A1* | 4/2020 | Li | G06K 9/6273 |
| 2020/0139973 | A1* | 5/2020 | Palanisamy | G08G 1/167 |
| 2021/0073563 | A1* | 3/2021 | Karianakis | G06N 3/084 |
| 2021/0090289 | A1* | 3/2021 | Karanam | G06K 9/6273 |
| 2021/0366161 | A1* | 11/2021 | Wong | G06N 3/084 |

OTHER PUBLICATIONS

Paul et al, "Spatial an Motion Saliency Prediction Method Using Eye Tracker Data for Video Summarization", 2018 IEEE transactions on circuits and systems for video technology, vo91. 29, No. 6, pp. 1856-1867 (Year: 2019).*

Mell et al., "The NIST Definition of Cloud Computing," Recommendations of the National Institute of Standards and Technology, U.S. Department of Commerce, Special Publication 800-145, Sep. 2011, 7 pgs.

Sharma et al., "Action Recognition Using Visual Attention," https://arxiv.org/pdf/1511.04119v2.pdf, Jan. 6, 2016, 11 pgs.

Tsunoda et al., "Football Action Recognition Using Hierarchical LSTM," http://openaccess.thecvf.com/content_cvpr_2017_workshops/w2/papers/Tsunoda_Football_Action_Recognition_CVPR_2017_paper.pdf, pp. 99-107.

Ulutan, et al., "Actor Conditioned Attention Maps for Video Action Detection," https://arxiv.org/abs/1812.11631, Dec. 30, 2018, pp. 1-10.

Wu et al., "Action Recognition with Joint Attention on Multi-Level Deep Features", https://arxiv.org/pdf/1607.02556.pdf, Jul. 9, 2016, 13 pgs.

* cited by examiner

ATTENTION GENERATION

BACKGROUND

The present disclosure relates to data processing, and more specifically, to attention generation for a video stream.

Attention mechanisms in neural networks are based on the visual attention mechanism found in humans. Generally, humans do not focus their attention on an entire scene at once, but sequentially focus on certain parts of the scene to extract relevant information. The neural networks with the attention mechanisms can be implemented to make predictions for input data, such as, a video stream.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to some embodiments of the present disclosure, there is provided a computer-implemented method for attention generation. In this method, a plurality of image frames can be obtained from a video stream. An original attention for a first image frame of the plurality of image frames can be generated. Then, at least one interested area can be identified in the first image frame. A local attention for each of the at least one interested area can be generated. Moreover, a total attention for the first image frame can be generated based on the original attention of the first image frame and the local attention of each of the at least one interested area.

According to some embodiments of the present disclosure, there is provided an apparatus for attention generation. The apparatus may comprise one or more processing units, a memory coupled to at least one of the processing units, and a set of computer program instructions stored in the memory. The set of computer program instructions may be executed by at least one of the processing units to perform the above method.

According to some embodiments of the present disclosure, there is provided a computer program product for attention generation. The computer program product may comprise a computer readable storage medium having program instructions embodied therewith. The program instructions, executable by a processor, cause the processor to perform the above method.

In addition to the exemplary aspects and embodiments described above, further aspects and embodiments will become apparent by reference to the drawings and by study of the following descriptions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
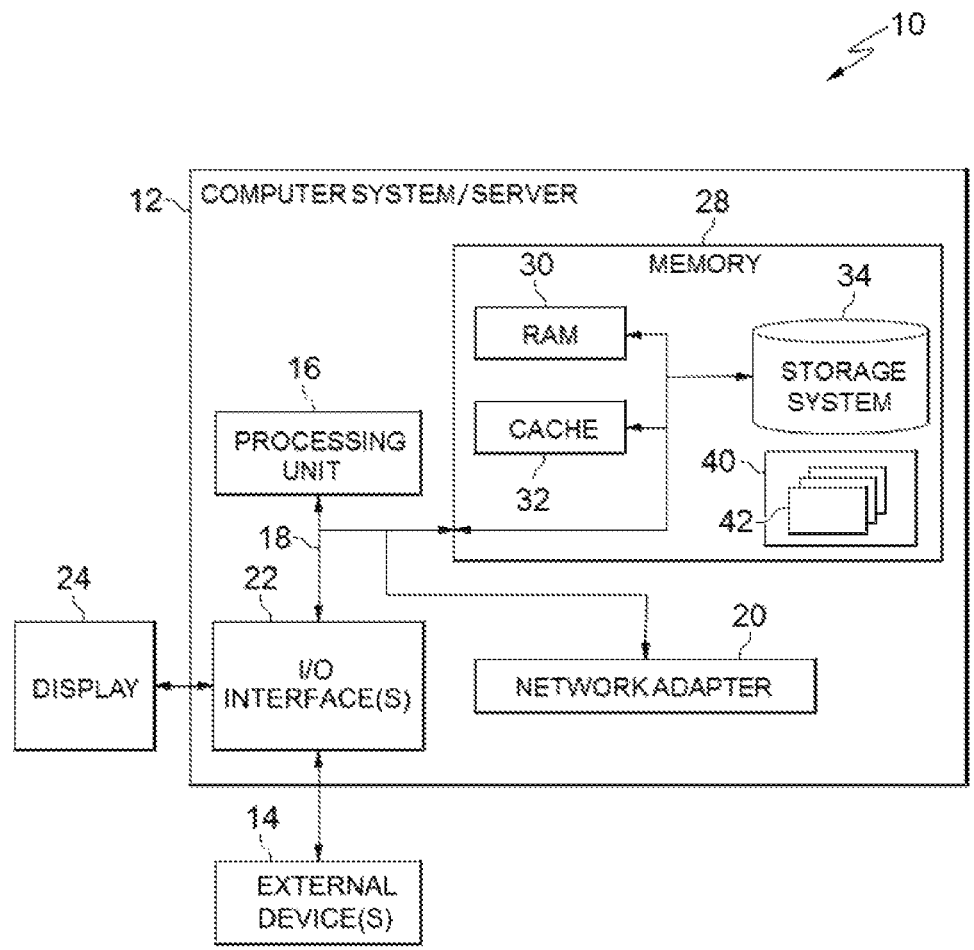
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
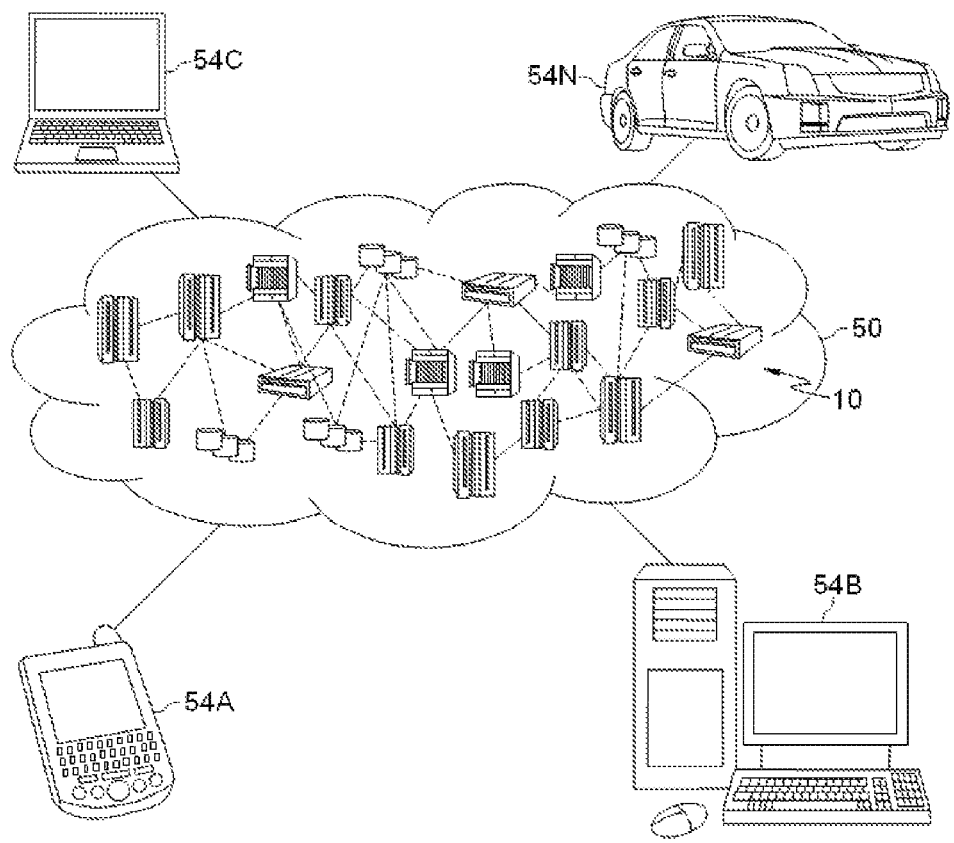
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
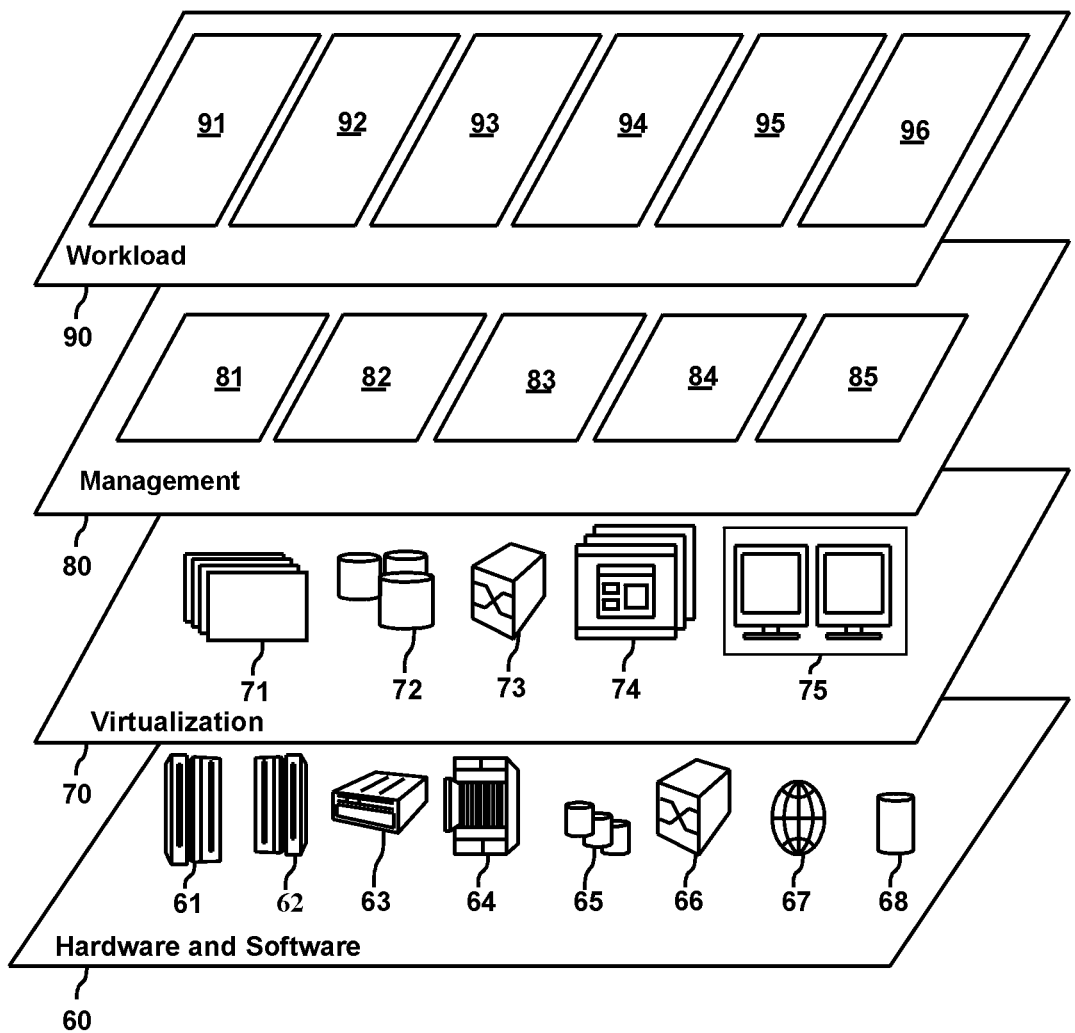
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and attention generation 96.

In deep neural networks, attention-based models may be widely used in a plurality of applications, such as caption generation, machine translation, image recognition, video analysis, and the like. For example, the attention-based model may potentially infer actions happening in a video stream by focusing only on relevant places in each frame of the video stream.

Generally, in a task of action recognition in a video stream, the attention-based model only applies attention to a frame level. It can be useful for simple actions, such as actions of a single person, in the video stream. However, for a video stream with multiple persons and their interactions, such as a video stream of a basketball game, recognition accuracy may be reduced if only the frame level attention is used. Embodiments of the present disclosure provide a method for attention generation in a video stream.

Figure 4:
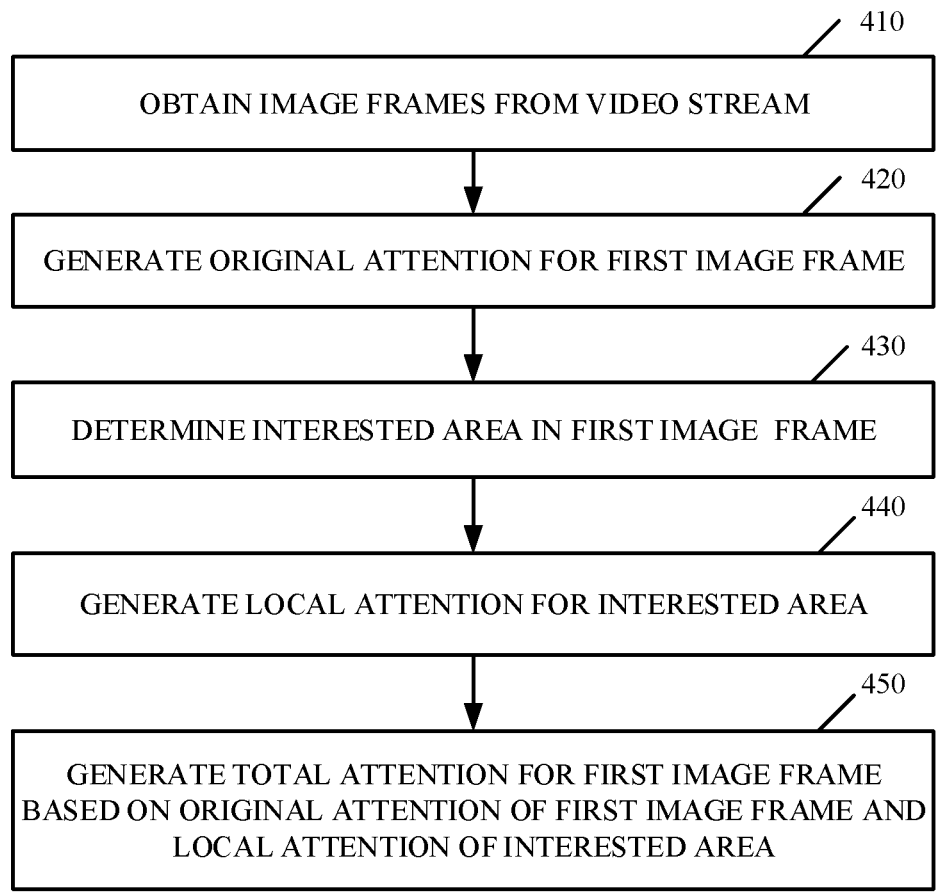
FIG. 4 depicts a schematic flowchart of a method for attention generation according to some embodiments of the present disclosure.

With reference now to FIG. 4, a schematic flowchart of a method for attention generation according to some embodiments of the present disclosure is shown. Such embodiments are described in detail below in conjunction with FIG. 4. It can be noted that the processing of attention generation according to embodiments of this disclosure could be implemented by a computing device, for example, the computer system/server 12 shown in FIG. 1.

At operation 410, the computing device obtains a plurality of image frames from a video stream. In some embodiments, the computing device may sample the video stream at a sampling rate to obtain the plurality of image frames, such as, a first image frame, a second image frame, and so on. In some embodiments, the computing device may preset the sampling rate according to contents of the video stream. For example, if the video stream is a motion video, such as an intense competition, the sampling rate may be set as a higher rate, for example 15 times per second. If the video stream is a static video, the sampling rate may be set as a lower rate, for example 5 times per second. It is to be noted that the sampled plurality of image frames can also be referred to as consecutive image frames.

At operation 420, the computing device generates an original attention for the first image frame of the plurality of image frames. Further, the computing device may also generate original attentions for other image frames of the plurality of image frames. In some embodiments, the computing device may generate, for each of the image frames, an original attention based on a first model and the plurality of image frames. Specifically, the computing device may generate the original attention for the first image frame based on the first model and the image frames. For example, the computing device may input the consecutive image frames, as input data, to the first model. The first model then may analyze context relationship, for example similarity, dissimilarity, etc., of the consecutive image frames based on hidden layers of the first model. Therefore, the first model may predict which part of the image frame is most likely to be focused on, and generate the original attention based on the context relationship. For example, if big differences are determined in a certain area in some consecutive image frames, more attention should be paid to that area since an action may be occurring in that area. Otherwise, if no difference is found in a certain area in some consecutive image frames, that area may be focused on less. In this case, the original attentions are generated with respect to the entire scene of the video stream based on the frame level attention generation mechanism. It can be understood that the method for generating the original attention described above is only intended to be illustrative, not limiting. Moreover, any suitable methods known in the art can be employed.

The original attention may be an attention matrix or an attention map for a whole image frame. For example, the original attention may be a 10×10 attention matrix. In the attention matrix or the attention map for the whole image frame, a higher value can correspond to important areas in the image frame, while a lower value can correspond to other areas in the image frame. The important areas may refer to areas which may be focused on by a viewer of the video stream, such as areas comprising an object (such as a human, an animal, a ball, etc.), an object with an action related to the object (such as shooting, lay-up, intercepting, etc. of a basketball player), or the like.

The first model can be implemented with an attention-based model. The attention-based model learns from the input data, predicts which parts in the image frame are important based on both spatial and temporal aspects, and associates higher values with those parts in the original attention. For example, the attention-based model may be a Recurrent Neural Network (RNN) or a Long-Short Term Memory (LSTM) network.

Specifically, the RNN refers to a class of neural network that includes a cyclical connection between nodes or units of the neural network. The cyclical connection creates an internal state that may serve as a memory that enables the RNN to model dynamical systems. The cyclical connections offer the RNN an ability to encode the memory. Thus, if successfully trained, the RNN may be specified for sequence learning applications. The LSTM network is a variant of the RNN. The LSTM network may be implemented in a microcircuit including multiple units to store values in memory using gating functions and multipliers. A LSTM may hold a value in memory for an arbitrary length of time. The LSTM network may include a hidden state, a memory state, forget, output, and input gates.

At operation 430, the computing device identifies at least one interested area in the first image frame. In some embodiments, the computing device may recognize at least one object in the first image frame. For example, the object could be any kind of object which is likely to be associated with an action. As an example, in a video stream of a basketball game, each player or a ball can be recognized as an object. The player may perform actions, such as shooting, lay-up, intercepting, or the like. Additionally, the ball is also an interesting object which needs to be focused on. It is to be understood that the actions described herein are only illustrative of the principles of the present disclosure and those skilled in the art may implement various modifications without departing from the scope and spirit of the disclosure.

After identifying at least one interested area in the first image frame, the computing device may identify an area comprising the individual recognized object as an interested area. Different interested areas may have same or different sizes. In some other embodiments, the computing device may identify the at least one interested area based on a preset rule. The preset rule can be learned according to any prior knowledge in the art. Further, the computing device may identify the respective interested areas in other image frames of the plurality of image frames.

At operation 440, the computing device generates a local attention for each of the at least one interested area. As an object moves in the video stream, locations of the object in different image frames can be different. The interested areas with respect to a same object in the different image frames can be identified as associated interested areas. In some embodiments, the computing device may identify a plurality of sets of associated interested areas for the different image frames.

In some embodiments, the computing device may group each of the at least one interested area in the first image frame and one or more other interested areas comprising a same recognized object in one or more other image frames of the plurality of image frames into a set of interested areas. Each set of interested areas may comprise a plurality of associated interested areas which comprise the same recognized object. In some other embodiments, a tracking technique can also be implemented in the present disclosure. For example, the computing device may track the recognized objects to determine the set of interested areas.

Next, the computing device may generate the local attention based on the first model and the set of interested areas. As described above, the first model could be the RNN or the LSTM network. In some embodiments, the computing device may input a set of interested areas to the first model. The first model may learn from the set of interested areas and predict the local attention for each of the interested areas.

Each local attention may be an attention matrix or an attention map for a corresponding interested area. In the attention matrix or the attention map for the interested area, a higher value can correspond to the one or more important areas in the interested area, while a lower value can correspond to other areas in the interested area. The respective local attentions may have different sizes. For example, one of the local attentions may be a 3×3 attention matrix, while another one may be a 5×5 attention matrix.

Next, the above process can be performed for other set of interested areas. It is to be noted that the local attentions are generated based on certain areas, i.e., the interested areas, in the image frames. Thus, compared with the original attention for the entire scene of the video stream, the local attentions can be more accurate for the object in the interested area. That is, the local attention may present more details for the interested area. It can be noted that the local attentions are generated in an area-of-frame level attention mechanism, which is more accurate for certain areas.

At operation 450, the computing device generates a total attention for the first image frame based on the original attention of the first image frame and the local attention of each of the at least one interested area. In another embodiment, the computing device may assign the original attention and the local attention of the same image frame with corresponding weights. The weights may be set based on certain rules. For example, the computing device may recognize an action of the object in each interested area, such that the weight can be assigned based on the action associated with the object comprised in the interested area. Further, the computing device may calculate a weighted sum of the original attention and the respective local attention as the total attention.

In some embodiments, the size of the original attention and the size of each of the at least one local attentions may be different. Thus, before calculating, the computing device may standardize the original attention and the at least one local attention to a same size. For example, a method of max pooling can be used to standardize the sizes. Specifically, the computing device may perform up-sampling or down-sampling to at least some of the original attention and the at least one local attention. Moreover, the computing device may use other methods known in the art as long as the sizes can be made uniform. As an example, if the original attention has a matrix size of 10×10 and the local attention has a matrix size of 3×3, the computing device may standardize them to a matrix size of 3×3 by using the method of max pooling.

In an example of a basketball game video, the computing device may recognize actions, such as shooting, lay-up, intercepting, or the like, in the interested areas. Then, the computing device may assign a weight of 0.5 to the original attention of an image frame, assign a weight of 0.3 to the local attention related to the shooting action in a first interested area of the image frame, assign a weight of 0.1 to the local attention related to the lay-up action in a second interested area of the image frame, and assign a weight of 0.1 to the local attention related to the intercepting action in a third interested area of the image frame. The sum of the weights is: 0.5+0.3+0.1+0.1=1. In this situation, more attention has been paid to the shooting action. Therefore, the total attention can be generated more flexibly.

Moreover, the computing device may also generate, for each of the other image frames, the total attentions based on the corresponding original attention and the local attention of each of the at least one interested area. Therefore, the total attention can be generated as an optimized attention matrix or attention map for the whole image frame based a multi-level attention generation mechanism comprising the frame level attention and the area-of-frame level attention. In this way, accuracy can be increased, and noise can be reduced. For example, if only the original attention is used in the attention generation, an important area of a first basketball player with a shooting action may not be recognized accurately if many other players may exist simultaneously in the image frame. But using the method described herein, the important area of the first basketball player can be recognized.

It is to be understood that, the sequence of the above operations is not intended to be limiting. For example, in some embodiments of the present disclosure, the above operations may be performed as shown in FIG. 4. In other embodiments of the present disclosure, the above operations may be performed in yet other sequences. For example, the computing device may perform operations 430 and 440 prior to performing operation 420.

Figure 5:
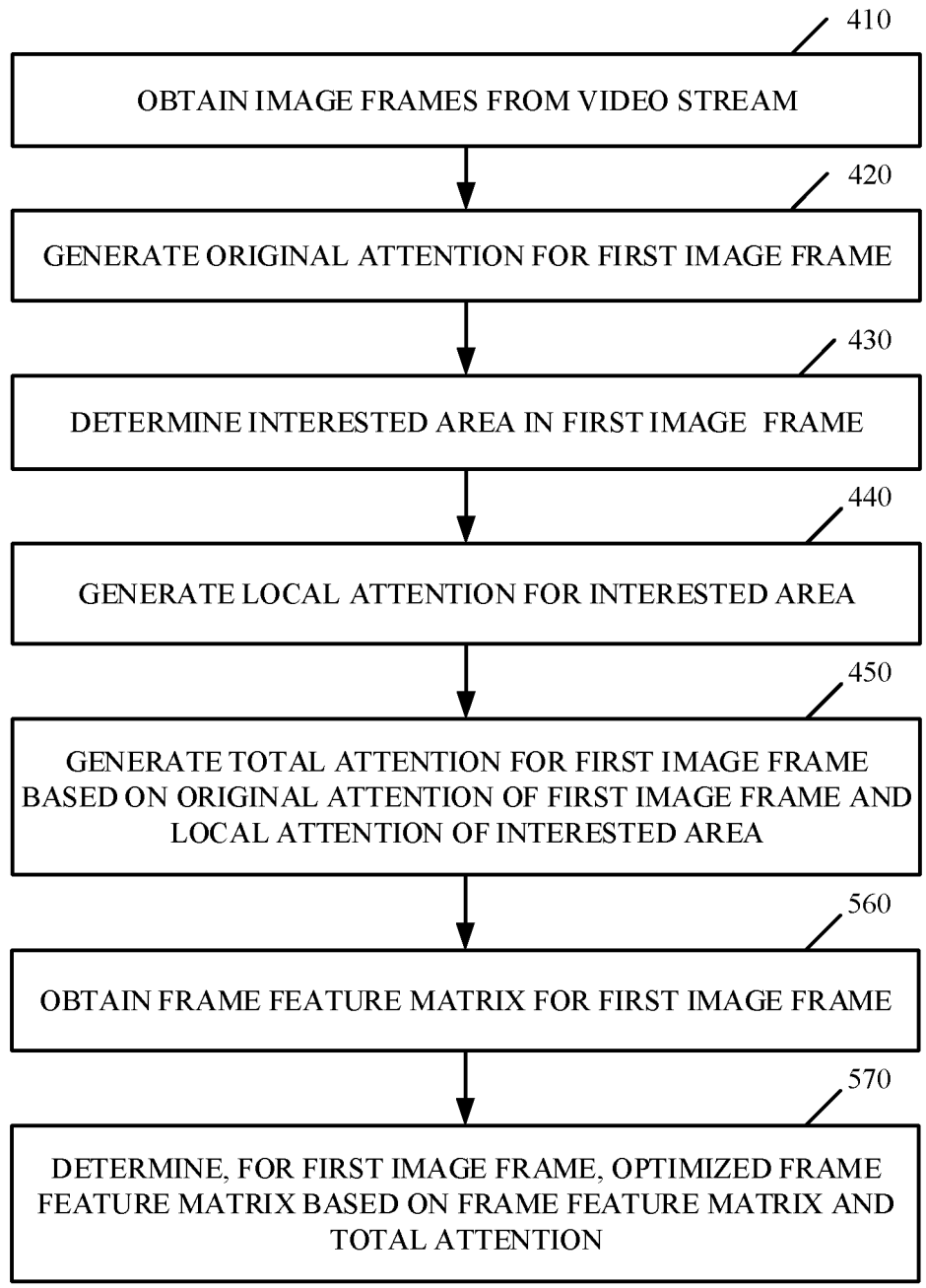
FIG. 5 depicts a schematic flowchart of a method for attention generation according to some embodiments of the present disclosure.

FIG. 5 shows a schematic flowchart of a method for attention generation according to some embodiments of the present disclosure. As shown in FIG. 5, the operations 410 to 450 are substantially the same as those described above. Subsequent operations 560 and 570 are described below.

At operation 560, the computing device may obtain, for the first image frame, a frame feature matrix based on a second model. For example, the second model may be a Convolutional Neural Network (CNN). The frame feature matrix can be represented as a feature map.

The CNN refers to a type of feed-forward artificial neural network. Convolutional neural networks may include collections of neurons, each neuron having a receptive field and also collectively tiling an input space. Convolutional neural networks may be used for pattern recognition and/or input classification.

At operation 570, the computing device may determine, for the first image frame, an optimized frame feature matrix based on the frame feature matrix and the total attention. The optimized frame feature matrix can be represented as an optimized feature map with attention. In some embodiments, the computing device may multiply the frame feature matrix by the total attention of the first image frame to determine the optimized frame feature matrix of the image frame.

Furthermore, the computing device may obtain the respective frame feature matrixes for the other image frames based on the second model and determine the respective optimized frame feature matrix for the other image frames based on the respective frame feature matrixes and the respective total attentions.

In some embodiments, the computing device may input the optimized feature maps to a fully connected layer of a neural network. That is, the computing device may establish a third model based on the optimized feature maps. Therefore, when video streams are input to the third model, the third model may make predictions for the input video streams. For example, actions in the input video streams can be recognized based on the third model.

According to embodiments of the present disclosure, the method for attention generation may improve accuracy of action recognition in video streams. Less attention can be paid to the unimportant areas in the video streams, such that noise in the video streams can be reduced. As computing resources can be distributed under direction of the attention mechanism, amounts of processing can be reduced, and efficiency of action recognition in video analysis can be increased.

Figure 6:
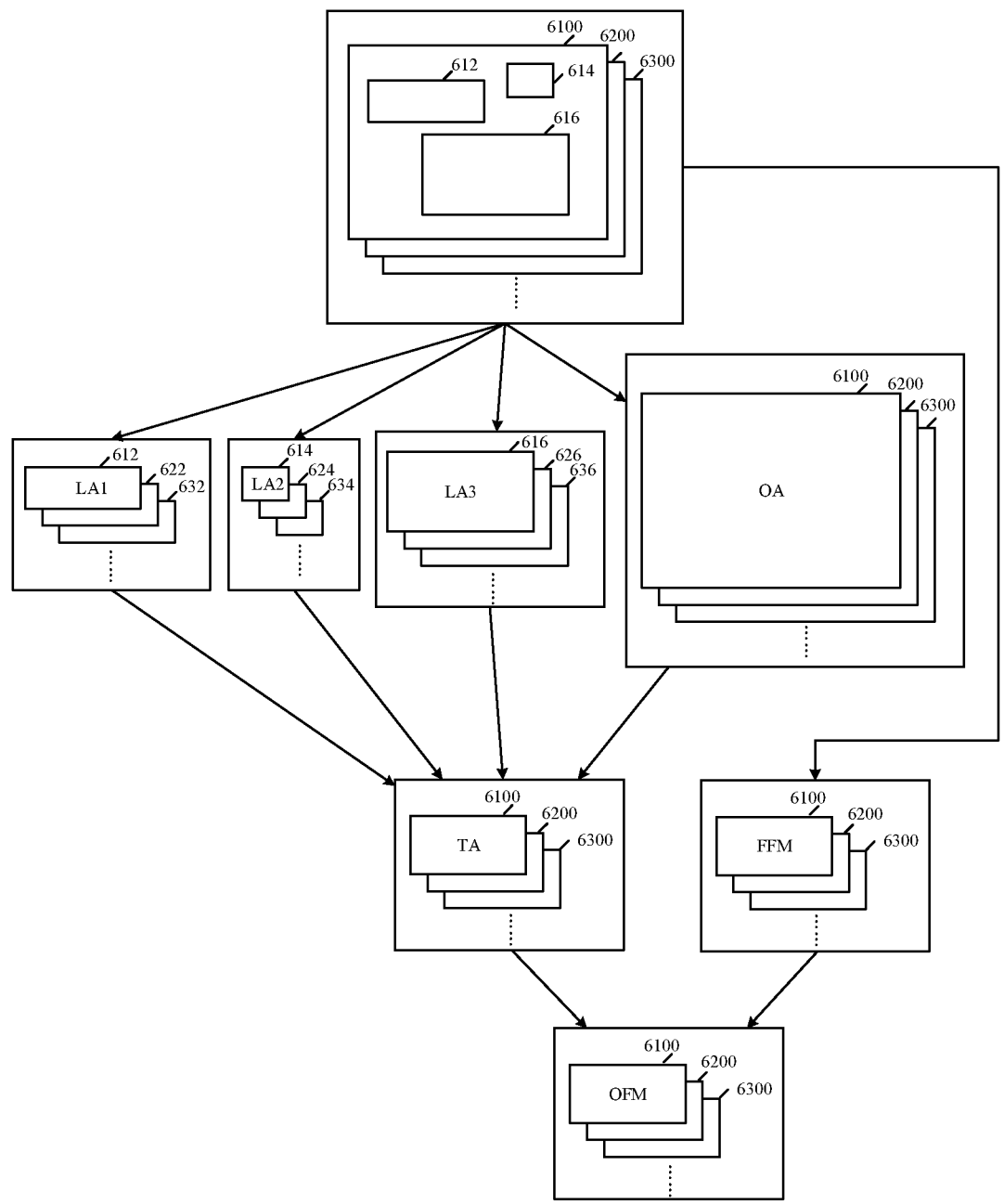
FIG. 6 depicts a schematic diagram for illustrating a process of attention generation in which the method shown in FIG. 4 or FIG. 5 can be implemented.

FIG. 6 shows a schematic diagram illustrating attention generation in which the method shown in FIG. 4 or FIG. 5 can be implemented. As shown in FIG. 6, the computing device may obtain a plurality of image frames, such as a first image frame 6100, a second image frame 6200, a third image frame 6300, and the like, from a video stream. It is to be understood that the number of the obtained image frames described herein is chosen for illustrative purposes only and is not intended to be limiting. For example, the computing device may obtain more than three image frames from the video stream.

Next, the computing device may generate an original attention for each image frame based on a first model, such as a recurrent neural network or a long short-term memory network, and the image frames. In some embodiments, the computing device inputs the first image frame 6100, the second image frame 6200, and the third image frame 6300 to the first model. The first model may learn from the consecutive image frames and predict a first original attention (OA) for the first image frame 6100, a second original attention for the second image frame 6200, and a third original attention for the third image frame 6300, based on similarity of the consecutive image frames. Each of the original attentions represents an interested area in each image frame and can be represented using the original attention map.

Moreover, the computing device may identify interested areas in each of the image frames. In some embodiments, the computing device may recognize objects in each image frame and may identify an area surrounding the individual recognized object as the interested area. As shown in the first image frame 6100, the computing device may identify interested areas 612, 614, and 616. Similarly, for the second image frame 6200, the computing device may identify interested areas 622, 624, and 626. For the third image frame 6300, the computing device may identify interested areas 632, 634, and 636.

In an example, a same object can be recognized in the interested areas 612, 622, and 632, such that the interested areas 612, 622, and 632 can be identified as a first set of associated interested areas. Moreover, the interested areas 614, 624, and 634 can be identified as a second set of associated interested areas. The interested areas 616, 626, and 636 can be identified as a third set of associated interested areas. In a further embodiment, the tracking technique can be implemented to track the objects. In another example, whether the interested areas are associated with each other can also be determined based on their locations in the respective image frames. It is to be noted that the number of interested areas identified in each image frame may or may not be the same, as some of the objects may appear only in some of the plurality of image frames.

Next, the computing device may generate local attentions for the identified interested areas based on the first model and the respective set of interested areas. In some embodiments, the computing device may identify a local attention LA1 for the interested area 612 based on the first model and the first set of associated interested areas. For example, the computing device may input images of the interested areas 612, 622, 632 to the first model, such that the first model may learn the input images and predict the local attention LA1 for the interested area 612.

Similarly, the computing device may identify a local attention LA2 for the interested area 614 based on the first model and the second set of interested areas. The computing device may also identify a local attention LA3 for the interested area 616 based on the first model and the third set of interested areas. Furthermore, the computing device may also identify the local attentions for other interested areas in the respective image frames, if such areas exist.

Next, the computing device may generate a total attention for each image frame based on the original attention of the image frame and the local attentions of the interested areas in the image frame. Taking, as an example, the first image frame 6100, the computing device may generate a total attention TA based on the original attention (OA), and the local attentions LA1, LA2, LA3 described above. In some embodiments, the computing device may generate a sum of the original attention (OA), and the local attentions LA1, LA2, LA3, as the total attention (TA).

In a further embodiment, the computing device may assign a weight to each of the original attention (OA) and the local attentions LA1, LA2, LA3. For example, the computing may recognize an action associated with the object recognized in the interested area. Then, the computing device may calculate a weighted sum of the original attention (OA), and the local attentions LA1, LA2, LA3, as the total attention (TA).

For example, the total weight could be 1. The original attention (OA) could be weighted with 0.5, the local attention LA1 could be weighted with 0.1, the local attention LA2 could be weighted with 0.2, and the local attention LA3 could be weighted with 0.2. Thus, the total attention for the first frame can be computed as: TA=(0.5×OA)+(0.1×LA1)+(0.2×LA2)+(0.2×LA3). As an example, if the OA is a matrix with one row and five columns (1, 1, 1, 0, 0), LA1 is a matrix (1, 0, 0, 0, 0), LA2 is a matrix (0, 1, 0, 0, 0), and LA3 is a matrix (0, 0, 1, 0, 0), then TA can be calculated as (0.8, 0.6, 0.6, 0, 0).

The computing device may further generate a total attention for the second image frame 6200 and a total attention for the third image frame 6300. Therefore, the total attentions for the respective image frames can be generated based on embodiments of the present disclosure.

Moreover, the computing device may obtain, for each of the image frames, a frame feature map based on a second model. For example, the second model may be a convolutional neural network. As shown in FIG. 6, the computing device may input the first image frame 6100 to the second model, such that the second model may predict the frame feature map (FFM) representing image patterns of the first image frame 6100. Furthermore, the computing device may input the second image frame 6200 to the second model, such that the second model may predict the frame feature map representing image patterns of the second image frame 6200. The computing device may input the third image frame 6300 to the second model, such that the second model may predict the frame feature map representing image patterns of the third image frame 6300.

Then, the computing device may determine, for each of the plurality of image frames, an optimized frame feature map based on the frame feature map and the total attention. Taking the first image frame 6100 as an example, the computing device may multiply the total attention (TA) by the frame feature map (FFM) to obtain the optimized frame feature map (OFM). Similar processes can be performed for other image frames to obtain an optimized frame feature map for the second image frame 6200, an optimized frame feature map for the third image frame 6300, and the like.

In a further embodiment, the computing device may use the optimized feature maps to establish a third model, such that the third model may make predictions for input video streams. For example, the third model may perform action recognition for the input video streams.

According to embodiments of the present disclosure, the method for attention generation may improve accuracy of action recognition in a video stream. The computing resources can be assigned under the direction of the attention mechanism, which reduces the amount of processing and increases the efficiency of action recognition in video analysis.

Additionally, in some embodiments of the present disclosure, an apparatus for attention generation can be provided. The apparatus may comprise one or more processing units, a memory coupled to at least one of the processing units, and a set of computer program instructions stored in the memory. The set of computer program instructions may be executed by at least one of the processing units to perform the above method.

In some other embodiments of the present disclosure, a computer program product for attention generation can be provided. The computer program product may comprise a computer readable storage medium having program instructions embodied therewith. The program instructions, executable by a processing unit, cause the processing unit to perform the above method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
obtaining, by one or more processing units, a plurality of image frames from a video stream;
generating an original attention for a first image frame of the plurality of image frames, wherein generating the original attention comprises:
comparing the first image frame with at least one consecutive image frame; and
generating the original attention based on a first model and the plurality of image frames;
identifying at least one interested area in the first image frame, wherein identifying the at least one interested area comprises:
recognizing at least one object in the first image frame; and
identifying an area comprising the at least one object as an interested area;
generating a local attention for each of the at least one interested area, wherein generating the local attention comprises:
grouping each of the at least one interested area and one or more other interested areas comprising a same object in one or more other image frames of the plurality of image frames into a set of interested areas; and
generating the local attention based on the first model and the set of interested areas; and
generating a total attention for the first image frame based on the original attention of the first image frame and the local attention of each of the at least one interested area.

2. The method according to claim 1, wherein the first model is a long-short term memory network or a recurrent neural network.

3. The method according to claim 1, wherein generating the total attention for the first image frame comprises:
assigning the original attention and the local attention with corresponding weights; and
calculating a weighted sum of the original attention and the local attention as the total attention.

4. The method according to claim 3, wherein the weights are assigned based on an action associated with the object in each of the at least one interested area.

5. The method according to claim 1, wherein generating the total attention for the first image frame comprises:
calculating a sum of the original attention and the local attention as the total attention.

6. The method according to claim 1, further comprising:
obtaining for the first image frame, a frame feature matrix based on a second model; and
determining, for the first image frame, an optimized frame feature matrix based on the frame feature matrix and the total attention.

7. The method according to claim 6, wherein the second model is a convolutional neural network.

8. An apparatus, comprising:
one or more processing units;
a memory coupled to at least one of the processing units; and
a set of computer program instructions stored in the memory and executed by at least one of the processing units in order to perform actions of:
obtaining a plurality of image frames from a video stream;
generating an original attention for a first image frame of the plurality of image frames, wherein generating the original attention comprises:
comparing the first image frame with at least one consecutive image frame; and
generating the original attention based on a first model and the plurality of image frames;
identifying at least one interested area in the first image frame, wherein identifying the at least one interested area comprises:
recognizing at least one object in the first image frame; and
identifying an area comprising one of the at least one object as an interested area;
generating a local attention for each of the at least one interested area; and
generating a total attention for the first image frame based on the original attention of the first image frame and the local attention of each of the at least one interested area, wherein generating the total attention comprises:
assigning the original attention and the local attention with corresponding weights, wherein the weights are assigned based on an action associated with the object in each of the at least one interested area; and
calculating a weighted sum of the original attention and the local attention as the total attention.

9. The apparatus according to claim 8, wherein generating the local attention for each of the at least one interested area comprises:
grouping each of the at least one interested area and one or more other interested areas comprising a same object in one or more other image frames of the plurality of image frames into a set of interested areas; and
generating the local attention based on the first model and the set of interested areas.

10. The apparatus according to claim 8, wherein generating the total attention for the first image frame comprises:
calculating a sum of the original attention and the local attention as the total attention.

11. The apparatus according to claim 8, wherein the actions further comprise:
obtaining, for the first image frame, a frame feature matrix based on a second model; and
determining, for the first image frame, an optimized frame feature matrix based on the frame feature matrix and the total attention.

12. A computer program product, comprising a computer readable storage medium having program instructions embodied therewith, the program instructions executable by a processing unit to cause the processing unit to:
obtain a plurality of image frames from a video stream;
generate an original attention for a first image frame of the plurality of image frames, wherein generating the original attention comprises comparing the first image frame with at least one consecutive image frame;
identify at least one interested area in the first image frame;
generate a local attention for each of the at least one interested area;

generate a total attention for the first image frame based on the original attention of the first image frame and the local attention of each of the at least one interested area;

obtain, for the first image frame, a frame feature matrix based on a model; and determine, for the first image frame, an optimized frame feature matrix based on the frame feature matrix and the total attention.

* * * * *